United States Patent
Hehl et al.

[11] 3,795,416
[45] Mar. 5, 1974

[54] HOUSING FOR MOUNTING AN OPERATING LEVER FOR AN AUTOMOTIVE VEHICLE DOOR LOCK

[75] Inventors: Klaus Friedrich Hehl; Bernd Schenk, both of Norderstedt, Germany

[73] Assignee: ITW-ATECO GmbH, Norderstedt, Germany

[22] Filed: June 23, 1972

[21] Appl. No.: 265,856

[52] U.S. Cl............................. 292/336.3, 292/113
[51] Int. Cl............................................ E05c 13/04
[58] Field of Search... 292/113, 336.3, 340; 248/27; 339/128

[56] References Cited
UNITED STATES PATENTS
3,544,148   12/1970   Sandor............................ 292/336.3
3,596,233   7/1971   De Vito.............................. 339/128

Primary Examiner—Richard E. Moore
Attorney, Agent, or Firm—J. R. Halvorsen; R. W. Beart

[57] ABSTRACT

A housing for an automobile vehicle door lock that is insertable into the inner wall of the vehicle door is disclosed. An operating lever is mounted on the housing and a shield covers the insert opening. A resilient tongue for releasably securing the housing to the door is located on the interior portion of the housing and is offset from the shield by a distance substantially equal to the thickness of the wall of the vehicle door.

2 Claims, 2 Drawing Figures

HOUSING FOR MOUNTING AN OPERATING LEVER FOR AN AUTOMOTIVE VEHICLE DOOR LOCK

This invention relates to a housing open at one side serving to mount an operating lever for an automotive vehicle door lock, said housing being capable of being inserted in an insert opening provided in the inner wall of the door, including a shield covering the insert opening as well as means for releasably securing the housing in the insert opening.

In a prior art handle housing made of resiliently deformable plastic of the mentioned type a frame is provided at the rear side extending over both longitudinal sides of the housing and one narrow side of the housing, said frame being integral with the housing and carrying ribs externally at the narrow side and in the vicinity of the free ends of the longitudinal sides. The ribs are provided with grooves extending parallel to the open front side of the housing and in alignment with one another, the width of said grooves generally corresponding to the thickness of the sheet-metal of the automotive vehicle door. At the free ends of the longitudinal sides of the frame resilient tongues reinforced toward the ends are provided which after inserting the frame in the complementarily shaped insert opening and after pushing it in direction of the narrow side of the frame snap behind noses formed in the profile of the insert opening. The inserted housing is locked against movements perpendicular relative to the door plane by the fact that the edges of the insert opening engage in the grooves provided in the ribs, while the arresting of the housing against movements parallel to the door plane is effected by an engagement on three sides and by the noses snapped-in which are provided at the fourth side.

Such a housing does guarantee a proper and reliable seat in the inner wall of the door, but the design is relatively expensive and requires an insert opening which has a peripheral edge provided with a plurality of base and projections.

The invention is based on the problem of providing a housing of the initially mentioned type serving to mount an operating lever for an automotive vehicle door lock, said casing in maintaining the reliable securing properties has a simpler design and requires an insert opening which is uncomplicated in its shape and which is easy to make.

According to this invention this problem is solved by a housing which has at least one resilient tongue provided at its external surface and arranged offset relative to the shield in a direction to the interior of the door, the engagement edge of said resilient tongue being arranged in a spacing from the abutment surface of the shield corresponding generally to the thickness of the inner wall of the door.

The housing of this invention can be made very simply as a result of its few functional parts, it next to the shield required anyhow and the mounting location for the operating lever only having the resilient tongues provided at the external surface. The insert opening provided in the inner wall of the door must be adapted to the contour of the external surface of the opening. Since the housing of this invention can be shaped relatively simple, for instance rectangular, oval or the like, the insert opening can also be shaped accordingly simple.

Plastic has found more and more acceptance in recent times as material for the lever housing; in this case the resilient tongues are preferably formed integral with the housing.

For achieving the resiliency of the tongues the entire housing can be made resilient per se, the spring tongues then being able to be formed as essentially rigid projections. Alternatively, the resilient tongues can also be made resilient relative to the housing, the housing then being permitted to have both a rigid and also additionally a resilient design.

For achieving the configuration of the tongues resilient perse they can be cut free from the housing wall with the exclusion of the side remote from the shield. Alternatively the housing wall can also have a cross sectional weakened portion at least partially around the resilient tongues. Finally it is also possible that the resilient tongues on the side facing the shield are separated by a slot from the housing wall, while the housing wall has a cross sectional weakened portion at the lateral edges of the tongue.

Since the housings, caused by the shape of the operating lever, generally have an elongated shape, preferably a resilient tongue each is provided at longitudinal sides of the housing opposing each other.

The invention has been illustrated by way of example in the drawing and will described hereinafter in detail in referring to the drawing. Therein:

Figure 1:
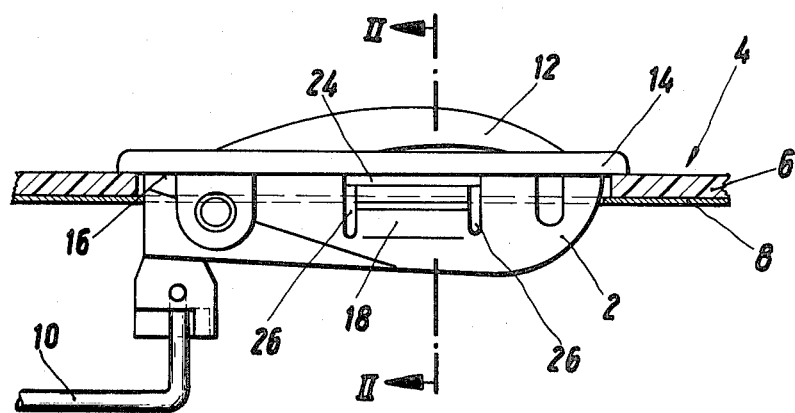
FIG. 1 is a side elevational view of an embodiment of the invention.

In the embodiment of the invention illustrated in the drawing the housing 2 has a rectangular shape in the plane view and accordingly is inserted in a correspondingly rectangularly shaped insert opening of the inner wall 4 of the door which is formed by a metal sheet 8 provided with an inner liner 6.

The housing 2 in which a lever 12 is mounted connected to a transmission linkage 10 and serving to operate an automotive vehicle door lock, is provided with a shield 14 at its top side which covers the insert opening provided in the inner wall 4 of the door which engages the inner wall 4 of the door with its abutment surface 16.

For securing the housing 2 inserted in the insert opening resilient tongues 18 and 20 are provided which are disposed at the external surface of the housing and of which one each is provided at the longitudinal sides of the housing opposing each other. The resilient tongues are provided with an abutment edge 22 at the side facing the shield 14 which is disposed in a spacing generally corresponding to the thickness of the inner wall 4 of the door from the abutment surface 16 of the shield 14 and snaps behind the sheet 8 of the inner wall 4 of the door after inserting the housing so that the edge of the insert opening on the one hand is firmly enclosed by the abutment surface 16 of the shield and on the other hand by the abutment edge 22 of the resilient tongues.

Figure 2:
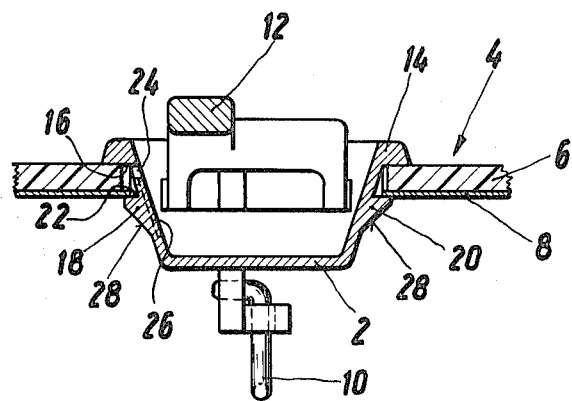
FIG. 2 is a sectional view along line II—II of FIG. 1.

In the event that the base body of the housing 2 has a sufficient resiliency, the resilient tongues can be formed as rigid projections 20, as illustrated in the right hand half of FIG. 2. When inserting the housing 2 in the insert opening the housing flexes as a result of its own resiliency and permits a snapping of the projections 20 behind the inner wall 4 of the door. For detaching a housing provided with such projections it merely has to be pressed together at the outside so far that the projections are in the internal space of the insert opening, the attachment thereby being released and the housing being able to be taken out of the insert opening.

In a housing with a lesser self-resiliency the tongues 18 are formed resilient relative to the housing 2, as illustrated in FIG. 1 and in the left half of FIG. 2. The self-resilient tongue 18 illustrated in the drawing is separated from the housing wall at the side facing the shield 14 by a slot 24. At the lateral edges of the resilient tongue 18 the housing wall has a cross sectional weakened portion 26 each which extends over the entire height of the resilient tongues 18. When inserting the housing in the insert opening the resilient tongues 18 are urged slightly inwardly and snap back behind the inner wall 4 of the door in order to anchor the housing 2 in the insert opening. For releasing a housing 2 provided with self-resilient tongues 18 the resilient tongues 18 must be urged back by means of a tool inserted through the slot 24 in order to unlock them.

Of course it is also possible to combine self-resilient tongues 18 with tongues formed as rigid projections 20, as illustrated in FIG. 2. Also self-resilient tongues 18 can readily be used in the event that the base body of the housing 2 already has sufficient self-resiliency.

For facilitating the insertion of the housing the resilient tongues 18 and 20 are provided with a bevelled portion 28 at the side remote from the shield 14 which slides along the edge of the insert opening when inserting the housing and urges the resilient tongues back.

In order to accomplish a firm clamp seat of the housing in the insert opening, the upper abutment edge 22 of the resilient tongues 18 can be bevelled outwardly, the sheet 8 of the inner wall 4 of the door engaging a point of the abutment edge 22 at which the resilient tongue 18 is still under a residual bias so that any clearance is compensated for.

What we claim is:

1. A housing for an automotive door lock that is insertable into an insert opening in the inner wall of a vehicle door comprising an operating lever mounted on said housing, a shield for covering the insert opening and means for releasably securing said housing in the insert opening comprising at least one resilient tongue located on the interior portion of said housing when said housing is inserted into said door, said resilient tongue being offset from said shield a distance substantially equal to the thickness of the wall of the vehicle door so as to secure a portion of the vehicle door in the vicinity of the insert opening between an abutment edge of said tongue and an abutment surface of said shield, said housing having a support wall for each of said resilient tongues and each of said resilient tongues having a lateral edge which is joined to its respective support wall by a weakened portion that extends along the length of said lateral edge.

2. A housing as set forth in claim 1 wherein said lateral edges of said tongues do not extend the entire thickness of the inner wall of the door to the abutment surface of said shield.

* * * * *